(12) United States Patent
Eklund et al.

(10) Patent No.: US 6,181,924 B1
(45) Date of Patent: Jan. 30, 2001

(54) METHOD AND SYSTEM FOR REJECTING INTERFERING SIGNALS

(75) Inventors: Michael Eklund, Stockholm; Thomas Östman, Spanga, both of (SE)

(73) Assignee: Telefonaktiebolaget LM Ericsson (publ), Stockholm (SE)

(*) Notice: Under 35 U.S.C. 154(b), the term of this patent shall be extended for 0 days.

(21) Appl. No.: 08/886,248

(22) Filed: Jul. 1, 1997

(51) Int. Cl.[7] .................. H04Q 7/20; H04Q 7/32
(52) U.S. Cl. .............. 455/296; 455/296; 455/63; 455/67.3; 455/110; 455/506; 455/303; 455/297; 455/278.1; 370/483
(58) Field of Search ............... 455/296, 297, 455/63, 67.3, 303, 550, 553, 422, 278.1, 226.1, 506, 60, 61, 561, 562, 101, 102, 110, 226.3, 284.1, 304, 305; 370/483

(56) References Cited

U.S. PATENT DOCUMENTS

| | | | |
|---|---|---|---|
| 4,313,116 | 1/1982 | Powell et al. | 343/100 |
| 4,916,454 | 4/1990 | Bull et al. | 342/373 |
| 5,303,411 | * 4/1994 | Stengel et al. | 455/296 |
| 5,410,750 | * 4/1995 | Cantwell et al. | 455/303 |
| 5,430,893 | * 7/1995 | Myer | 455/303 |
| 5,603,087 | * 2/1997 | Shultz | 455/296 |
| 5,771,439 | * 6/1998 | Kennedy, Jr. et al. | 455/63 |
| 5,812,539 | * 9/1998 | Dent | 455/296 |

OTHER PUBLICATIONS

P. Petrus et al., "Cochannel Interference Rejection for AMPS Signals Using Spectral Correlation Properties and an Adaptive Array", Proceedings of the Vehicular Technology Conference, Chicago, Jul. 25–28, 1995, vol. 1, IEEE, pp. 30–34.

\* cited by examiner

*Primary Examiner*—Lee Nguyen
*Assistant Examiner*—Keith Ferguson
(74) *Attorney, Agent, or Firm*—Burns, Doane, Swecker & Mathis, L.L.P.

(57) ABSTRACT

A method and system for rejecting interfering signals in a wireless communication system employing antenna diversity. According to the method, the angle between an interfering signal and a desired carrier signal is determined and used to estimate an offset angle. The offset angle is incrementally adjusted such that, when added to the received signal, the carrier-to-interference (C/I) ratio of the received signal is substantially maximized.

16 Claims, 5 Drawing Sheets

C = CARRIER
I = INTERFERER

C = CARRIER
I = INTERFERER

METHOD AND SYSTEM FOR REJECTING INTERFERING SIGNALS

FIELD OF THE INVENTION

The present invention relates generally to wireless communication systems. More particularly, the present invention is directed to a method and system for rejecting interfering signals in a communication system employing antenna diversity.

BACKGROUND OF THE INVENTION

Mobile communication systems have experienced explosive growth, as an ever- increasing number of subscribers demand mobile communication services. To meet this demand, increased system capacity is necessary, and can be achieved in many ways. One way is to reduce the "cell" size (that is, the coverage area of an individual base station). However, this approach also results in frequencies being reused within a smaller area, thereby increasing interference and decreasing speech quality. While factors such as fading and noise can also reduce speech quality, interference is typically the dominating form of disturbance; therefore, methods to reduce the effects of interference are highly desirable to improve speech quality.

Interference typically manifests itself as discordant noise, and can be difficult to remove. There are generally two types of interference: co-channel interference and adjacent channel interference. Co-channel interference (interference between two or more channels which are assigned to the same frequency, as mentioned above) is typically the dominant type, and varies with frequency reuse distance. Adjacent channel interference is generally controlled more easily, as it can be reduced to an acceptable level through appropriate filtering of the received signal.

To improve speech quality, many conventional systems employ diversity schemes, in which communication signals are received at two or more input branches. The branches are combined according to one of a variety of diversity combining techniques. One known diversity algorithm uses equal-gain combining to reduce interference. Equal-gain combining is a co-phase combining technique in which a combined signal is generated as the sum of the instantaneous phase envelopes of the individual branches. While relatively simple, this technique does not adequately reduce the effects of co-channel interference.

It would be desirable to reduce the effects of co-channel interference in a communication system, particularly in a system employing antenna diversity.

SUMMARY OF THE INVENTION

The present invention overcomes the above-noted problems, and achieves other advantages, by providing for a mobile communication system and method which substantially maximizes the carrier-to-interference (C/I) ratio of a received signal. The present invention assumes that a source of an interfering communication signal is typically found to be a certain angle from the affected receiving antennas, and therefore the interfering angle is offset by some phase angle from the desired carrier signal. According to exemplary embodiments of the present invention, when a modulated communication signal which includes a desired carrier signal and one or more interfering signals is received at a receiving antenna, an offset value is determined which, when added to the received communication signal, will substantially maximize the carrier-to-interference (C/I) ratio. The offset value can be first estimated (based on, e.g., the angle to the source of the interfering signal), and adjusted incrementally by comparing the C/I ratio calculated using the estimated offset angle with the C/I ratio calculated using the incrementally-adjusted estimated offset angle, and selecting the offset angle corresponding to the better C/I ratio.

BRIEF DESCRIPTION OF THE DRAWINGS

A more complete understanding of the present invention can be obtained upon reading the following Detailed Description of the Preferred Embodiments, in conjunction with the accompanying drawings, in which like reference indicia are used to designate like elements, and in which.

DETAILED DESCRIPTION OF THE PREFERRED EMBODIMENTS

For purposes of explanation, the method and system of the present invention will be described with respect to the dual-mode (analog/digital) systems known as AMPS/D-AMPS. The analog mode is implemented with digital signal processing. AMPS uses frequency modulation with a carrier frequency of approximately 800 MHZ. The speech signal has a standard 16 bits PCM format and is sampled at 8 KHz. The base stations use equal-gain diversity with two antennas, a common pre-detector diversity arrangement. According to the equal-gain diversity technique, measurements are made of the instantaneous signal to noise ratio (SNR) in each branch, and the signals are then combined. While the analog mode can be used for both data and speech communication, the present invention is preferably directed to reducing the effects of interference for speech signals.

Figure 1:
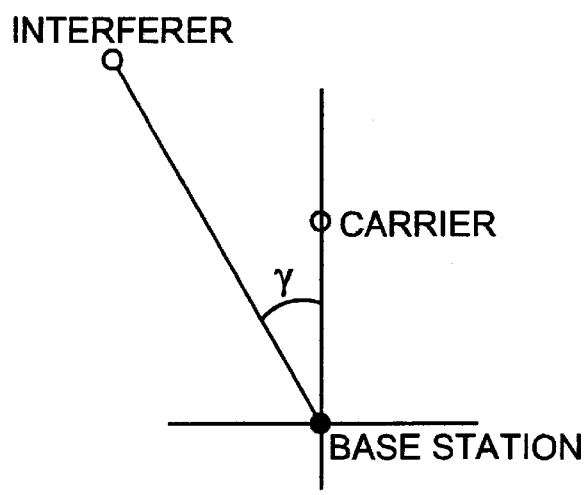
FIG. 1 is a diagram showing a typical interference condition which can be remedied by the present invention.

FIG. 1 shows typical interference condition which can be remedied according to the present invention. As shown, a carrier signal is transmitted from a desired source such as a mobile communication device to the base station, while an interferer such as a second mobile communication device transmitting on the same channel, transmits an interfering signal to the base station. Assuming that the carrier is at an angle of 0° with respect to the base station, the interferer in this example is at an angle of y° with respect to the carrier and base station. The method of the present invention makes use of the principle that intefering signals tend to originate from sources positioned at particular angles from the desired communication device.

Figure 2:
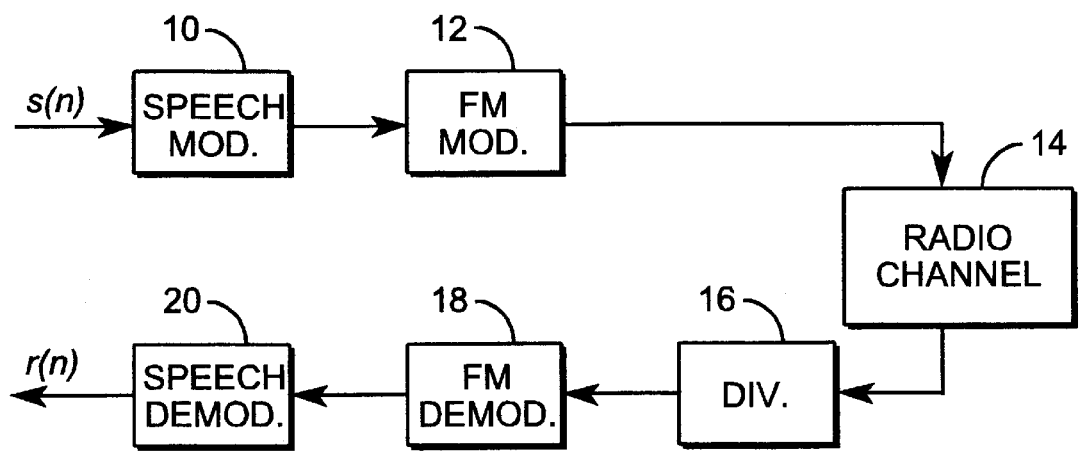
FIG. 2 is a block diagram of the transmitter and receiver components in a typical communication channel.

FIG. 2 shows a signal path over a typical Analog Voice Channel (AVC). As shown, a clean speech signal s(n) is sampled at, e.g., 8 KHz. The signal s(n) is speech modulated in speech modulator 10, which performs preemphasis, compression, PCM conversion, and limiting to reduce spurious signals. This baseband signal is then FM modulated in FM modulator 12 and transmitted over the radio channel 14. The received signal is diversity combined in combiner 16 according to an appropriate combining algorithm which preferably incorporates the principles of the present invention. The combined signal is then FM demodulated to baseband by FM demodulator 18 and speech demodulated in speech demodulator 20 to form a demodulated received signal r(n).

The receiver (i.e., elements 16, 18 and 20) typically performs a number of channel measurements, including received signal strength (RSS) and carrier to interference ratio (C/I). The C/I and RSS measures are typically available for all branches when diversity combining is used. The C/I measurement is available, for example, every 20 ms, and is calculated as an average over the previous 20 ms interval. The C/I measurement is obtained from analyzing the amount of amplitude modulation on the carrier signal during the observed time interval.

The analog signal from the mobile, s(n), can be expressed as:

$$s(n) = C \cdot \cos(\omega_c + \Phi(n)_c)$$

where C is the amplitude and the phase $\Phi(n)_c$ is the frequency modulated speech signal. Suitable modulation techniques are well-known. One such modulation technique is described in "Communication Systems Engineering", John G. Proakis et al., Prentice-Hall, N.J., 1994. With co-channel interference added to the carrier signal s(n):

$$s_1(n) = C \cdot \cos(\omega_c + \Phi(n)_c) + I \cdot \cos(\omega_c + \Phi(n)_I)$$

In complex variables:

$$s_1(n) = Re(C \cdot e^{j \cdot (\omega + \Phi(n)c)} + I \cdot e^{j \cdot (\omega + \Phi(n)I)})$$

where I is the amplitude and $\Phi(n)_I$ is the phase of the interfering signal.

Figure 3:
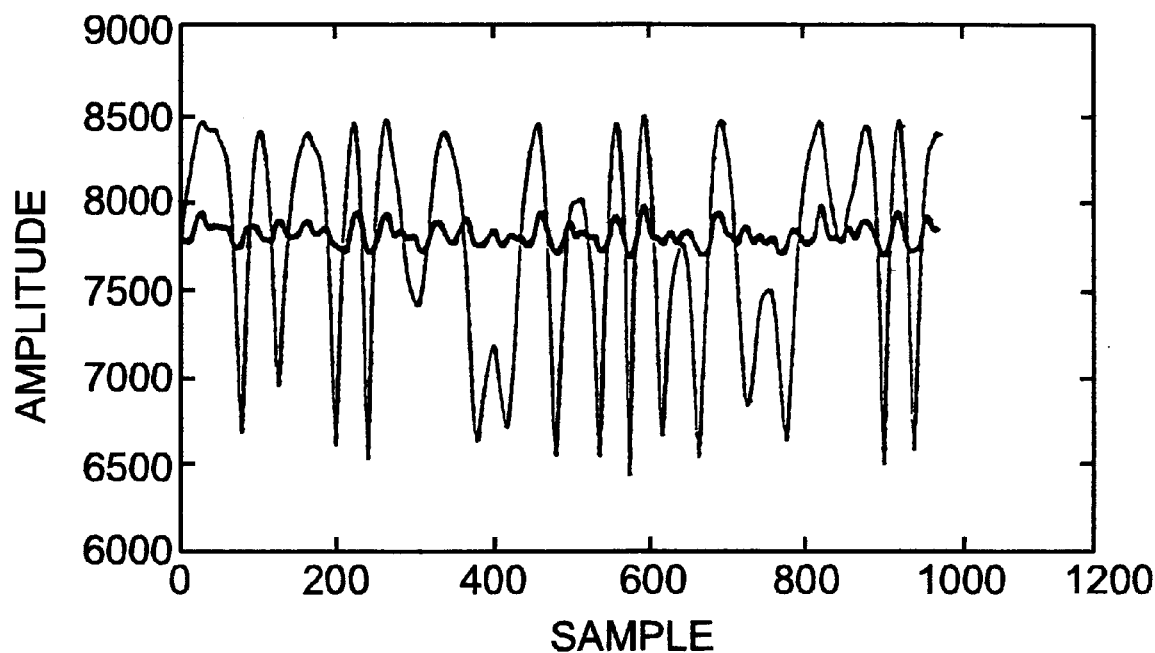
FIG. 3 is a graphical representation of the effects of interference on a received signal.

FIG. 3 is a graph showing the effects of interference. It can be seen that interference significantly increases the variance of the amplitude of the received signal. The interference added to the signal affects both the received signal strength and the phase. The method of the present invention makes use of the increased amplitude variance caused by the interference, as shown in FIG. 3.

Figure 4:
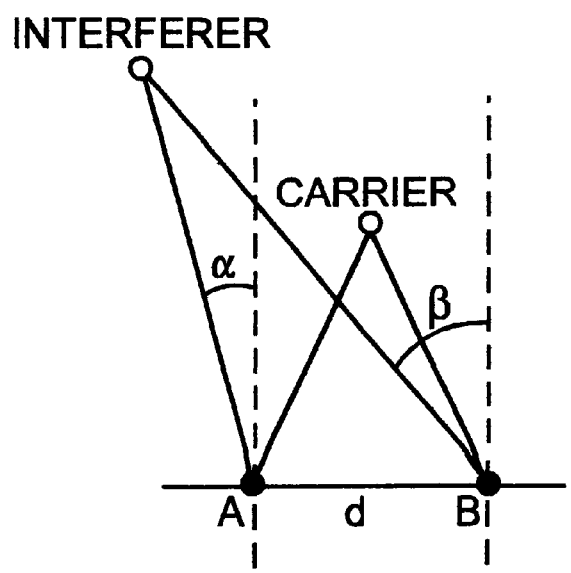
FIG. 4 is a diagram showing the relative positions of a mobile unit, a source of interference, and a receiving base station employing antenna diversity.

FIG. 4 is a diagram showing the relative positions of a mobile 40 transmitting a desired carrier, interference signal 42 transmitting an interfering signal, and diversity antennas 44 and 46. As can be seen, the branches do not receive the same signal because the antennas are separated by a distance d.

As a result, both the RSS and the phase values differ between branches A and B. The differences between the branches can be used to calculate the angle to the interferer. If the carrier has the same angle as the interfering signal, the angle to the interferer cannot be identified. One known method of determining the angle to the interference source is described in "The Constant Modulus Array for Co-channel Signal Copy and Direction Finding", John J. Shynk et al., IEEE Transaction on signal processing, vol 44, no 3, March 1996. According to the present invention, the interfering signal is rejected by determining an appropriate offset angle, and changing the angle of the received signal by the offset angle so that the direction to the interferer is ±180°.

In FM modulation 12 (FIG. 2), the speech signal S(n) is integrated prior to transmission over the channel. The speech information is obtained at the receiver from the derivative of the integrated signal, i.e., the slope between two samples. Therefore, adding a constant offset angle to the received signal, which is equivalent to changing the phase of the received signal, does not affect the information contained in the speech signal S(n) or received signal r(n).

Figure 5:
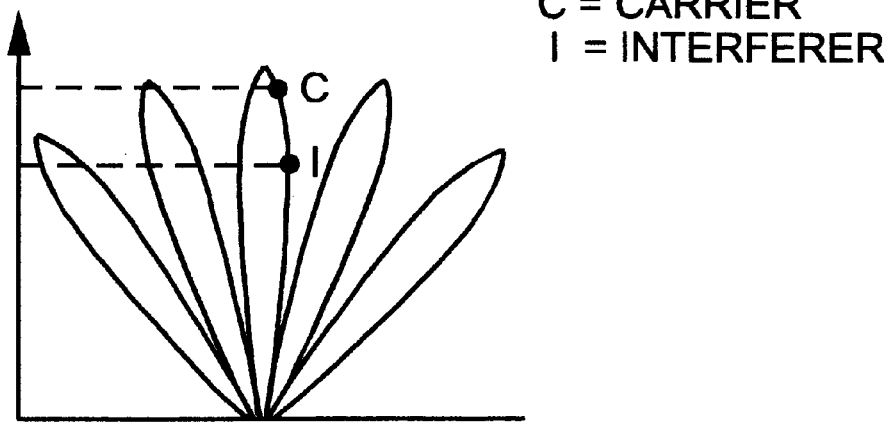
FIG. 5 is a graphical representation of received carrier and interfering signal strength.

FIG. 5 shows a graphical representation of received carrier and interfered signal strength at the diversity combiner 16, in this case assuming that the diversity antenna includes five antenna elements.

Figure 6:
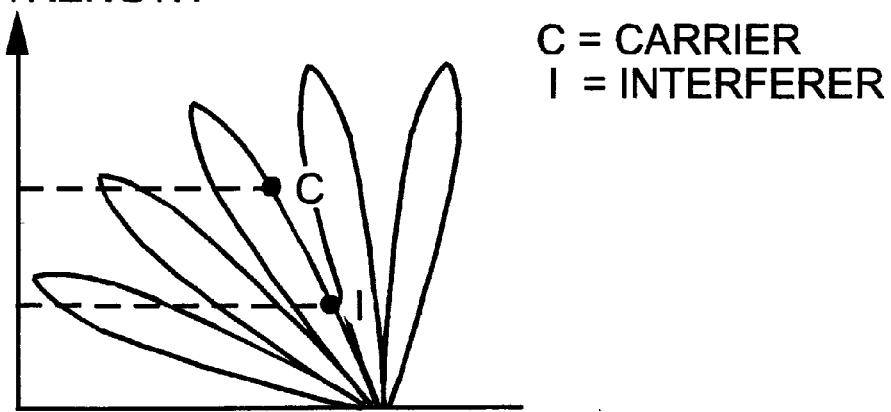
FIG. 6 is a graphical representation of received carrier and interfering signal strength, as adjusted according to the present invention.

The effect of adding an offset angle to the received signal is that the "fmgerpattern" of FIG. 5 is effectively rotated, and both C and I changes their position in the "finger", i.e., C and I change their relative signal strength. In this case, as depicted in FIG. 6, if the turn is to the left, both the carrier and the interferer will lose some signal strength, but the interfering signal strength will decrease more than the carrier signal strength. This is because the angle between the interferer and the antennas has changed and getting closer to 180°. The result is a gain in C/I at the cost of decreased carrier power.

The present invention will now be further described mathematically, assuming that the desired signal is disturbed only by interference. It is further assumed that the angles to the antennas from the sender are the same, i.e., both the antennas receive the same signal from the sending mobile. If the angle of the sending signal is 0°, then the received signal in a first branch A can be expressed as:

$$r_A = C \cdot e^{j \cdot \Phi_c} + I \cdot e^{j \cdot (\Phi_c + \alpha)} = R_A \cdot e^{j \Phi_A}$$

The resulting amplitude (RSS) and phase is then:

$$R_A = |r_A|$$
$$= \sqrt{(C \cdot \cos(\Phi_C) + I \cdot \cos(\Phi_I))^2 + (C \cdot \cos(\Phi_C) + I \cdot \cos(\Phi_I + \alpha))^2}$$
$$= \sqrt{C^2 + I^2 + 2 \cdot C \cdot I \cdot \cos(\Phi_C + \Phi_I + \alpha)}$$

$$\Phi_A = \operatorname{atan}\left(\frac{\operatorname{Im}(r_A)}{\operatorname{Re}(r_A)}\right)$$
$$= \operatorname{atan}\left(\frac{C \cdot \sin(\Phi_C) + I \cdot \sin(\Phi_I + \alpha)}{C \cdot \cos(\Phi_C) + I \cdot \cos(\Phi_I + \alpha)}\right)$$
$$= \Phi_C + \Phi_I + \alpha'$$

The received signal, amplitude, and phase can be similarly expressed for a second diversity branch B, where the angle to the source of the interfering signal is β instead of α. Thus, the received signal at each branch can then be expressed in the following manner, using complex variables:

$$r(n)_A = C(n) \cdot e^{j \cdot \Phi(n)_c} + I(n) \cdot e^{j \cdot (\Phi(n)_I + \alpha)}$$
$$= R_A(n) \cdot e^{j \Phi(n)_A}$$
$$r(n)_B = C(n) \cdot e^{j \cdot \Phi(n)_c} + I(n) \cdot e^{j \cdot (\Phi(n)_I + \beta)}$$
$$= R_B(n) \cdot e^{j \Phi(n)_A}$$

where α and β, is the angle between the interferer and the antennas. If the interferer is from an adjacent channel, the received signals can be expressed in a similar manner, where an extra angle is included in the values α and β.

The speech signal to be recovered is in the real value of $r(n)_A$ and $r(n)_B$.

In the equal-gain combiner 16, the signals can be combined as follows:

$$r(n) = r(n)_A + r(n)_B$$
$$= R_A(n) \cdot e^{j \cdot \Phi(n)_A} + R_B(n) \cdot e^{j \cdot \Phi(n)_B}$$
$$= R(n) \cdot e^{j \cdot \Phi(n)}$$

Figure 7:
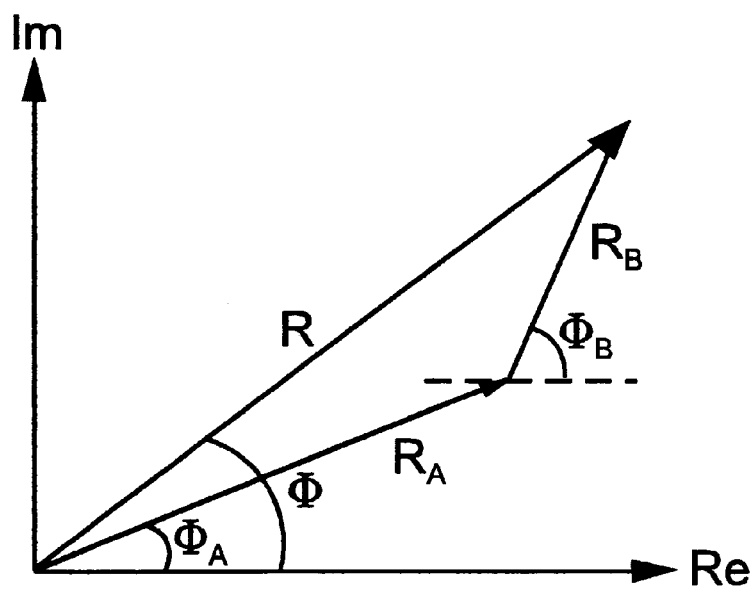
FIG. 7 is a vector representation of the addition of two diversity branches.

FIG. 7 shows the branches as two vectors which are added together to form a resultant vector. The output from the equal-gain combiner 16 is the phase $\Phi$.

In cosines form, R is calculated as:

$$R = \sqrt{R_A^2 + R_B^2 + (2 \cdot R_A \cdot R_B \cdot \cos(\Phi_A - \Phi_B))}$$

where (n) is left out for simplicity. Assuming a relatively short time interval, such that the angle to the interferer is constant, the cosines term of R can be expressed as:

$$\cos(\Phi_A - \Phi_B) = \cos((\Phi_C + \Phi_I + \alpha') - (\Phi_C + \Phi_I + \beta')) = \cos(\Delta)$$

where $\Delta = \alpha' - \beta'$, and $\alpha'$, $\beta'$ are the resulting angles when $\Phi_A$ and $\Phi_B$ are calculated.

The resulting angles are affected by C and I. The resulting R is then:

$$R = \sqrt{R_A^2 + R_B^2 + (2 \cdot R_A \cdot R_B \cdot \cos(\Delta))}$$

$R_A$ and $R_B$ include the carrier and the interferer amplitudes, and $\Delta$ includes information about the angle to the interferer.

The interfering signal increases the variance of the RSS, as shown in FIG. 3. The variance of R is equal to the interfering power. The carrier power is equal to the mean value of R.

The carrier-to-interference ratio can thus be expressed as:

$$C/I = \frac{\text{carrier power}}{\text{interfering power}} = \frac{\text{mean of } R}{\text{variance of } R} = \frac{E(R)}{\sigma^2}$$

variance $\sigma' = E(R^2) - E(R)^2$

By changing the angle of the received signal away from the interferer in one of the branches, the variance of R decreases, but the mean of R decreases at the same time; however, the variance decreases faster than the mean value. When the angle between the interferer and the receiving antennas (the phrase angle) is approximately ±180°, the C/I is maximized.

Because the signal strength of the sender decreases as the angle to the antennas is changed away from the interferer, a control signal can be sent from the base station to the mobile to increase the mobile power (power control) if the sender signal strength falls below a threshold level. By multiplying the C/I with the carrier power (E(R)), the loss in carrier strength can be compensated.

Figure 8:
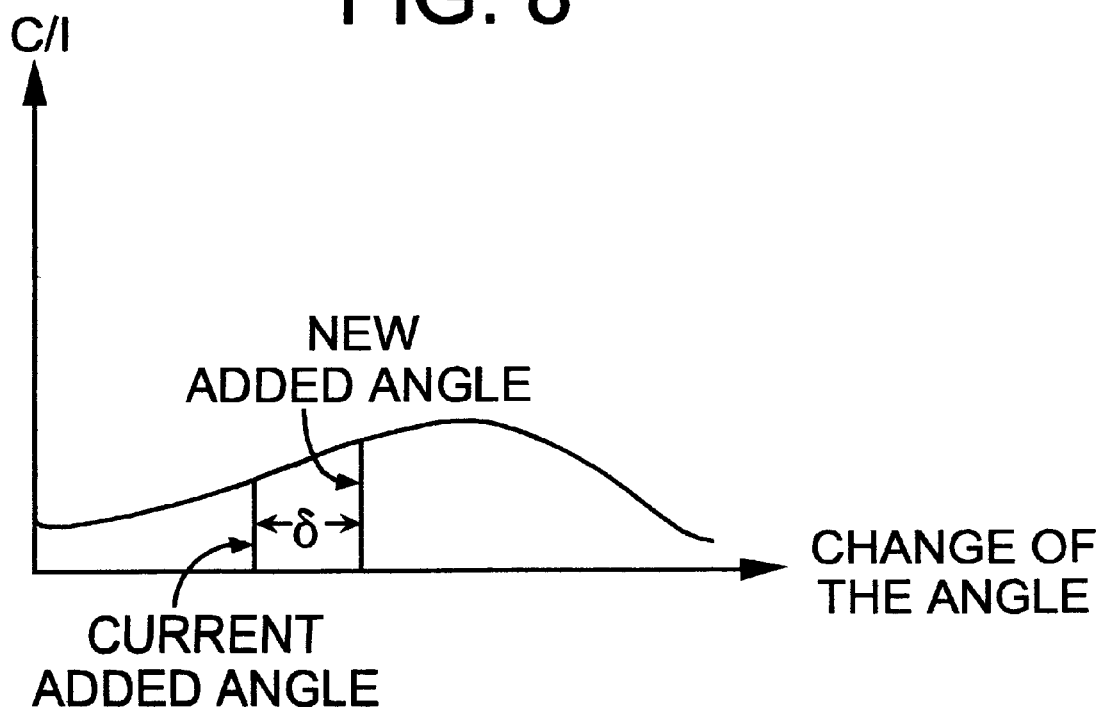
FIG. 8 is a graphical representation showing the adjustment of the offset angle as an incremental adjustment.

To reject the interferer, according to an embodiment of the present invention, an offset angle $\Phi_{offset}$ is determined from the angle to the interferer. The offset angle is ideally that angle which, when added to the received signal, will result in a condition where C/I is substantially maximized. The offset angle can be estimated, and the estimated value adjusted by relatively small increments until a maximum C/I is found. By adjusting the offset angle in relatively small steps($\delta$) of, e.g., a few degrees at a time, the C/I ratio can be substantially maximized and the effects of the interfering signal substantially minimized. The adjustment is made by comparing a first C/I ratio with a current angle offset to a second C/I ratio with a second (adjusted) offset angle, and adjusting the offset angle toward the value which results in the larger C/I ratio (i.e., reducing interference). Such an adjustment is shown graphically in FIG. 8. The method of the present invention can be implemented by suitable processing circuitry located in the receiver.

Because the angle to the interferer changes when the interferer is moving, the adjustment of the offset angle preferably occurs faster than the change of the angle between the interferer and the antennas. For example, if an interfering mobile unit is about 2000 m away from the base station and has a velocity of 100 km/h, the angle change rate is approximately 1°/s. In this situation, the offset angle is preferably calculated and adjusted a minimum of 2 times/s if $\delta$ is in steps of 1°.

Figure 9:
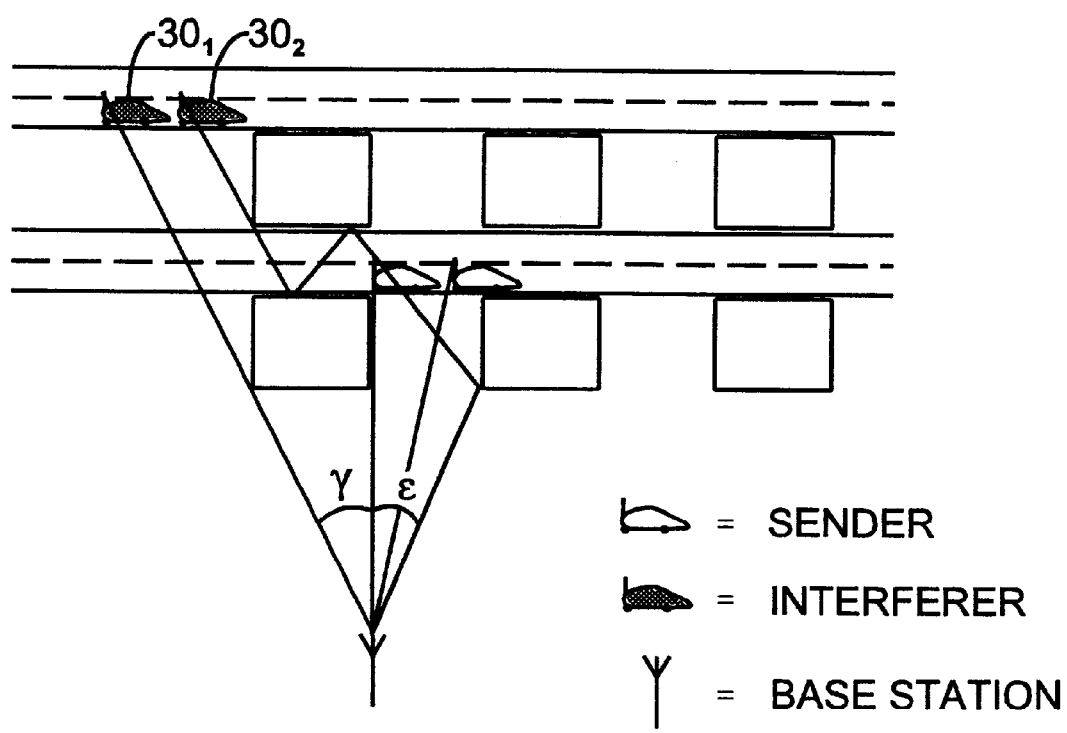
FIG. 9 is a diagram illustrating an interference condition in a fading environment.

FIG. 9 illustrates a condition in which the interferer is moving in a fading environment. As shown, the angle to the interferer (shown in positions $30_1$ and $30_2$ can change suddenly (from Y to E) due to multipath propagation of the interfering signal. Thus, in a fading environment it is more difficult to identify the angle, because the sender and the interferer are fading independently and the fading has the effect of changing the angle. Thus, the method of the present invention is preferably performed during time intervals when the angle to the interferer can be reliably determined.

When a static channel is used the direction to the interferer should change more predictably, because during a static channel there is no fading to disturb the sending and interfering signals.

In summary, the method of the present invention involves identifying the direction to the interferer, determining an offset angle, and then removing the effects of the interferer by adding the offset angle to the received signal. The received signal, after equal-gain diversity combining, is used to calculate the C/I ratio for different offset angles of the combined signal and to regulate the offset angle so as to maximize the C/I ratio. The method of the present hi invention is particularly effective during intervals when the transmitted and interfering signals are not subject to severe fading.

While the foregoing description includes numerous details and specificities, it is to be understood that these are for purposes of explanation only. Many modifications will be readily apparent to those of ordinary skill in the art which are clearly within the spirit and scope of the invention, as defined by the following claims and their legal equivalents.

What is claimed is:

1. A method for reducing the effects of interference in a communication system, comprising the steps of:

receiving a modulated communication signal at a receiving antenna, the received modulated communication signal including a desired carrier signal and one or more interfering signals;

determining an offset angle to be added to the received modulated communication signal, the offset angle increasing the carrier-to-interference ratio of the desired carrier;

adding the offset angle to the received modulated communication signal to generate an offset signal; and demodulating the offset signal.

2. The method of claim 1, further comprising the step of estimating an angle from the receiving antenna to a source of one of the one or more interfering signals, and wherein the offset angle is determined based on the estimated angle.

3. The method of claim 1, wherein the receiving antenna is a diversity antenna having multiple antenna elements, each antenna element receiving a communication signal.

4. The method of claim 2, wherein the step of estimating is performed based on a received signal strength of the received modulated communication signal.

5. The method of claim 2, wherein the step of estimating is performed based on phase values associated with the received modulated communication signal.

6. The method of claim 1, wherein the offset angle is approximately +180°.

7. The method of claim 1, wherein the wireless communication system is an analog wireless communication system.

8. The method of claim 7, wherein the wireless communication system is a multiple-mode wireless communication system which includes an analog mode of communication.

9. The method of claim 1, wherein the communication signal is a speech signal.

10. The method of claim 1, wherein the step of determining is performed by determining an estimated offset angle; comparing a previous carrier-to-interference ratio with a subsequent carrier-to-interference ratio calculated based on the estimated offset angle; and incrementally adjusting the estimated offset angle based on the comparison to substantially maximize the carrier-to-interference ratio.

11. A receiver for receiving a communication signal which includes a desired signal and at least one interfering signal, the receiver comprising:

means for determining an offset angle to be added to the communication signal, the offset angle increasing the carrier-to-interference ratio of the desired signal;

means for adding the offset angle to the communication signal to produce an offset signal; and means for demodulating the offset signal.

12. The receiver of claim 11, further comprising means for estimating an angle from the receiver to a source of one of the at least one interfering signal, and wherein the offset angle is determined based on the estimated angle.

13. The receiver of claim 11, further comprising a diversity antenna having multiple antenna elements for receiving the communication signal.

14. The receiver of claim 12, further comprising means for determining a received signal strength of the communication signal, and wherein the estimated angle is determined based on the received signal strength.

15. The receiver of claim 11, wherein the offset angle is approximately ±180°.

16. The receiver of claim 11, wherein the offset angle is adjusted incrementally to substantially maximize the carrier-to-interference ratio.

* * * * *